US012638732B2

(12) United States Patent
Yoshida

(10) Patent No.: US 12,638,732 B2
(45) Date of Patent: May 26, 2026

(54) LIQUID CRYSTAL ELEMENT AND LIQUID CRYSTAL ELEMENT PRODUCTION METHOD

(71) Applicant: KWANSEI GAKUIN EDUCATIONAL FOUNDATION, Hyogo (JP)

(72) Inventor: Hiroyuki Yoshida, Suita (JP)

(73) Assignee: KWANSEI GAKUIN EDUCATIONAL FOUNDATION, Hyogo (JP)

( * ) Notice: Subject to any disclaimer, the term of this patent is extended or adjusted under 35 U.S.C. 154(b) by 0 days.

(21) Appl. No.: 18/720,886

(22) PCT Filed: Dec. 20, 2022

(86) PCT No.: PCT/JP2022/046757
§ 371 (c)(1),
(2) Date: Jun. 17, 2024

(87) PCT Pub. No.: WO2023/120496
PCT Pub. Date: Jun. 29, 2023

(65) Prior Publication Data
US 2025/0053047 A1     Feb. 13, 2025

(30) Foreign Application Priority Data

Dec. 23, 2021     (JP) ................................. 2021-209270

(51) Int. Cl.
*G02F 1/1347*     (2006.01)
*G02F 1/1334*     (2006.01)
*G02F 1/1343*     (2006.01)

(52) U.S. Cl.
CPC .......... *G02F 1/1347* (2013.01); *G02F 1/1334* (2013.01); *G02F 1/134309* (2013.01); *G02F 1/13439* (2013.01)

(58) Field of Classification Search
CPC ................. G02F 1/1347; G02F 1/1334; G02F 1/134309; G02F 1/13439; G02F 1/13345; G02F 1/13476
See application file for complete search history.

(56) References Cited

U.S. PATENT DOCUMENTS 5,889,571 A *   3/1999  Kim .................. G02F 1/133788
                                                            349/124
6,469,765 B1 *  10/2002  Matsuyama ...... G02F 1/134363
                                                            349/143

(Continued)

FOREIGN PATENT DOCUMENTS

CN        202372728 U     8/2012
JP        2020-148808 A     9/2020
(Continued)

OTHER PUBLICATIONS

Espacenet English machine translation of JP2021-63156A (Year: 2021).*

(Continued)

*Primary Examiner* — David Y Chung
(74) *Attorney, Agent, or Firm* — Studebaker Brackett PLLC

(57)     ABSTRACT
A liquid crystal element (100) includes a first electrode (20), a first liquid crystal layer (40), a second electrode (50), a second liquid crystal layer (70), and a third electrode (80). The first electrode (20) has light transmittance. The first liquid crystal layer (40) contains first macromolecules and a plurality of first liquid crystal molecules. The second electrode (50) has light transmittance. The second liquid crystal layer (70) contains second macromolecules and a plurality of second liquid crystal molecules. The first liquid crystal layer (40) is placed between the first electrode (20) and the second electrode (50). The second liquid crystal layer (70) is placed between the second electrode (50) and the third electrode (80).

(Continued)

electrode (80). The first macromolecules form a three-dimensional network structure in the first liquid crystal layer (40). The second macromolecules form a three-dimensional network structure in the second liquid crystal layer (70).

12 Claims, 12 Drawing Sheets

(56) References Cited

U.S. PATENT DOCUMENTS

| | | | | |
|---|---|---|---|---|
| 7,079,203 | B1 * | 7/2006 | Huang | G02F 1/1334 349/94 |
| 2002/0154377 | A1 | 10/2002 | Pepper | |
| 2008/0123025 | A1 * | 5/2008 | Li | G02F 1/1396 349/74 |
| 2010/0115764 | A1 | 5/2010 | West et al. | |
| 2014/0152944 | A1 * | 6/2014 | Zhao | G02F 1/13471 349/96 |
| 2015/0212373 | A1 * | 7/2015 | Hirota | G02F 1/133711 349/42 |
| 2019/0098289 | A1 * | 3/2019 | Palmer | G02B 30/25 |
| 2019/0227354 | A1 * | 7/2019 | Hayashida | G02F 1/13476 |
| 2021/0080759 | A1 | 3/2021 | Zhao et al. | |
| 2021/0240044 | A1 * | 8/2021 | Bi | G02F 1/136222 |

FOREIGN PATENT DOCUMENTS

| | | |
|---|---|---|
| JP | 2020-187293 A | 11/2020 |
| JP | 2021-060521 A | 4/2021 |
| JP | 2021063156 A * | 4/2021 |
| KR | 10-2013-0141058 A | 12/2013 |
| WO | 2017/094215 A1 | 6/2017 |
| WO | 2018/066555 A1 | 4/2018 |

OTHER PUBLICATIONS

Inoue et al.; "Nematic liquid crystal nanocomposite with scattering-free, microsecond electro-optic response"; Optical Materials Express; vol. 4, No. 5; 2014; pp. 1-8.
Ozaki et al.; "Electro-Tunable Defect Mode in One-Dimensional Periodic Structure Containing Nematic Liquid Crystal as a Defect Layer"; Jpn. J. Appl. Phys.; vol. 41; 2002; pp. L1482-L1484.
Hoy et al.; "Non-Mechanical Beam Steering with Polarization Gratings: A Review"; Crystals 11, 361; 2021; pp. 1-21.
Lin et al.; "Liquid crystal lenses with tunable focal length"; Liquid Crystals Reviews; vol. 5, No. 2; 2017; pp. 111-143.
International Search Report issued in PCT/JP2022/046757; mailed Mar. 20, 2023.
Written Opinion of the International Searching Authority issued in PCT/JP2022/046757; mailed Mar. 20, 2023.
An Office Action; "Notice of Reasons for Refusal," mailed by the Japanese Patent Office on Jul. 1, 2025, which corresponds to Japanese Patent Application No. 2023-569446 and is related to U.S. Appl. No. 18/720,886; with English language translation.
An Office Action; "Notice of Reasons for Refusal," mailed by the Japanese Patent Office on Sep. 9, 2025, which corresponds to Japanese Patent Application No. 2023-569446 and is related to U.S. Appl. No. 18/720,886; with English language translation.

* cited by examiner

LIQUID CRYSTAL ELEMENT AND LIQUID CRYSTAL ELEMENT PRODUCTION METHOD

TECHNICAL FIELD

The present invention relates to a liquid crystal element and a liquid crystal element production method.

BACKGROUND ART

The polymer-dispersed liquid crystal element disclosed in Patent Literature 1 includes a first transparent substrate, a first electrode, a phase-separated liquid crystal layer, a second electrode, and a second transparent substrate. The first transparent substrate, the first electrode, the phase-separated liquid crystal layer, the second electrode, and the second transparent substrate are stacked in the stated order. The phase-separated liquid crystal layer contains a polymer and a plurality of liquid crystal molecules. The polymer forms a three-dimensional network structure in the phase-separated liquid crystal layer.

The polymer-dispersed liquid crystal element is switched to either one of a transparent state and a scattering state. In the transparent state, no voltage is applied to the first electrode and the second electrode. In the scattering state by contrast, voltage is applied between the first electrode and the second electrode. The plurality of liquid crystal molecules in the polymer-dispersed liquid crystal element, which form a three-dimensional network structure in the phase-separated liquid crystal layer, can respond within sub-milliseconds.

PRIOR ART DOCUMENTS

Citation List

Patent Literature

Patent Literature 1
  Japanese Patent Application Laid-Open Publication No. 2020-187293

SUMMARY OF INVENTION

Technical Problem

However, in the polymer-dispersed liquid crystal element disclosed in Patent Literature 1, which has a three-dimensional network structure of the molecules in the phase-separated liquid crystal layer, the voltage applied between the first electrode and the second electrode is large, approximately 100 V.

The present invention has been made in view of the foregoing and has its object of providing a liquid crystal element that enables the orientation state of a plurality of liquid crystal molecules to be switched by application of a low level of voltage, even when the macromolecules in a liquid crystal layer form a three-dimensional network structure, and a method for producing the liquid crystal element.

Solution to Problem

According to a first aspect of the present invention, a liquid crystal element includes a first electrode, a first liquid crystal layer, a second electrode, a second liquid crystal layer, and a third electrode. The first electrode has light transmittance. The first liquid crystal layer contains first macromolecules and a plurality of first liquid crystal molecules. The second electrode has light transmittance. The second liquid crystal layer contains second macromolecules and a plurality of second liquid crystal molecules. The third electrode has light transmittance. The first liquid crystal layer is place between the first electrode and the second electrode. The second liquid crystal layer is placed between the second electrode and the third electrode. The first electrode, the first liquid crystal layer, the second electrode, the second liquid crystal layer, and the third electrode are stacked in a predetermined direction. The first macromolecules form a three-dimensional network structure in the first liquid crystal layer. The second macromolecules form a three-dimensional network structure in the second liquid crystal layer. A state of the liquid crystal element is switched to either a first state or a second state. In the first state, the plurality of first liquid crystal molecules and the plurality of second liquid crystal molecules each are aligned in the predetermined direction. In the second state, the plurality of first liquid crystal molecules and the plurality of second liquid crystal molecules each are aligned in a direction across the predetermined direction.

In the liquid crystal element of the present invention, it is preferable that a potential difference between the first electrode and the second electrode and a potential difference between the first electrode and the second electrode are formed in the first state to align the plurality of first liquid crystal molecules and the plurality of second liquid crystal molecules in the predetermined direction, and no potential difference is formed between the first electrode, the second electrode, and the third electrode in the second state to align the plurality of first liquid crystal molecules and the plurality of second liquid crystal molecule in the direction across the predetermined direction.

In the liquid crystal element of the present invention, it is preferable that the first electrode and the third electrode are kept at a first potential while the second electrode is kept at a second potential different from the first potential in the first state, and that no potential difference is formed between the first electrode, the second electrode, and the third electrode in the second state.

In the liquid crystal element of the present invention, it is preferable that: light passes through the first electrode, the first liquid crystal layer, the second electrode, the second liquid crystal layer, and the third electrode; the liquid crystal element emits first light in the first state; the liquid crystal element emits second light in the second state; and the first light differs from the second light in phase, wavelength, amount of light, polarization state, or direction of travel.

Preferably, the liquid crystal element of the present invention further includes a third liquid crystal layer containing third macromolecules and a plurality of third liquid crystal molecules; and a fourth electrode with light transmittance. Preferably, >the third liquid crystal layer is placed between the third electrode and the fourth electrode, and the third macromolecules form a three-dimensional network structure in the third liquid crystal layer.

Preferably, the liquid crystal element of the present invention further includes: a first alignment film that defines orientation of the plurality of first liquid crystal molecules; and a second alignment film that defines orientation of the plurality of second liquid crystal molecules. Preferably, the first alignment film is placed between the first liquid crystal layer and the first electrode or the second electrode, and the second alignment film is placed between the second liquid crystal layer and the second electrode or the third electrode.

In the liquid crystal element of the present invention, it is preferable that the first liquid crystal layer further contains a surface conditioning agent for conditioning a surface of the first liquid crystal layer in formation of the first liquid crystal layer and that the second liquid crystal layer further contains a surface conditioning agent for conditioning a surface of the second liquid crystal layer in formation of the second liquid crystal layer.

Preferably, the liquid crystal element of the present invention further includes: a first substrate with light transmittance; and a second substrate. Preferably, the first electrode, the first liquid crystal layer, the second electrode, the second liquid crystal layer, and the third electrode are placed between the first substrate and the second substrate.

In the liquid crystal element of the present invention, preferably, the first macromolecules and the second macromolecules are macromolecules obtained by polymerizing a plurality of liquid crystal monomers.

According to a second aspect of the present invention, a liquid crystal element production method includes: preparing a substrate with light transmittance; forming a first electrode on the substrate; applying a liquid crystal solution containing a plurality of monomers and a plurality of liquid crystal molecules onto the first electrode; forming a liquid crystal layer by forming macromolecules by polymerizing the plurality of monomers, the macromolecules forming a three-dimensional network structure; forming a second electrode on the liquid crystal layer; forming an alignment film that defines orientation of the plurality of liquid crystal molecules; and rendering the alignment film uniaxially orientated by irradiating the alignment film with linearly polarized light.

Advantageous Effects of Invention

According to the present invention, the orientation state of the plurality of liquid crystal molecules can be switched by application of a low level of voltage, even when the macromolecules in the liquid crystal layer form a three-dimensional network structure.

DESCRIPTION OF EMBODIMENTS

Figure 1:
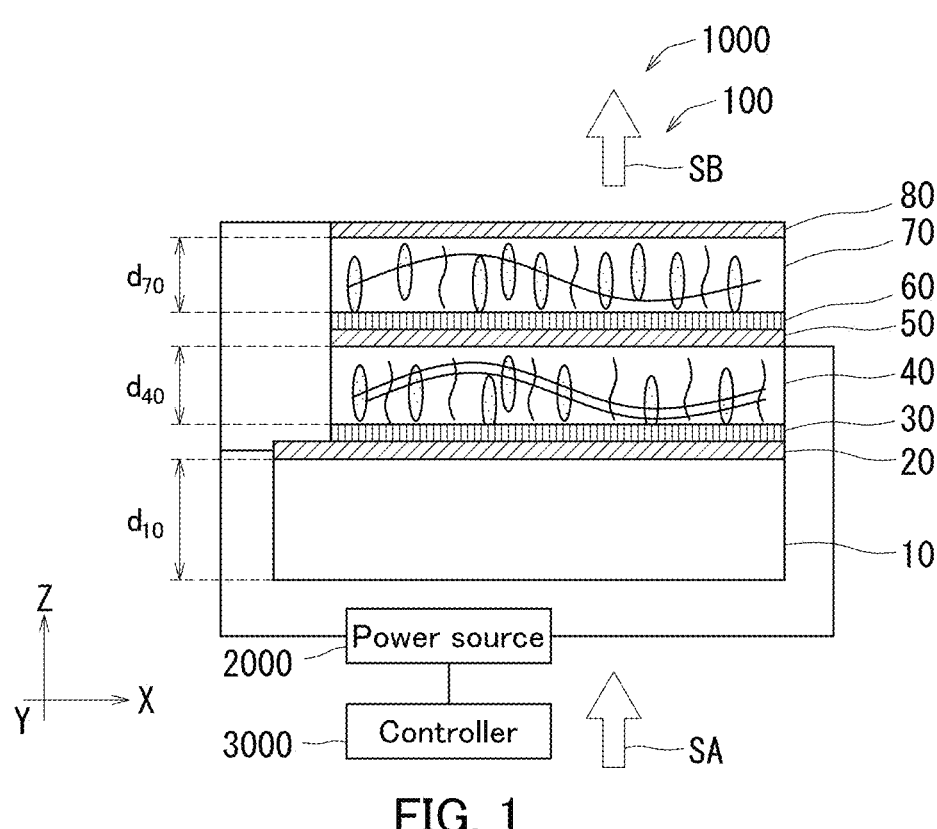
FIG. 1 is a cross-sectional view of a liquid crystal device according to a first embodiment of the present invention.

The following describes embodiments of the present invention with reference to the accompanying drawings. In some drawings, a three-dimensional Cartesian coordinate system including mutually perpendicular X, Y, and Z axes are used for description. Note that elements that are the same or equivalent are indicated by the same reference signs in the drawings and description thereof is not repeated. Hatching indicating cross sections is omitted as appropriate for the sake of drawing simplicity.

First Embodiment

Figure 2:
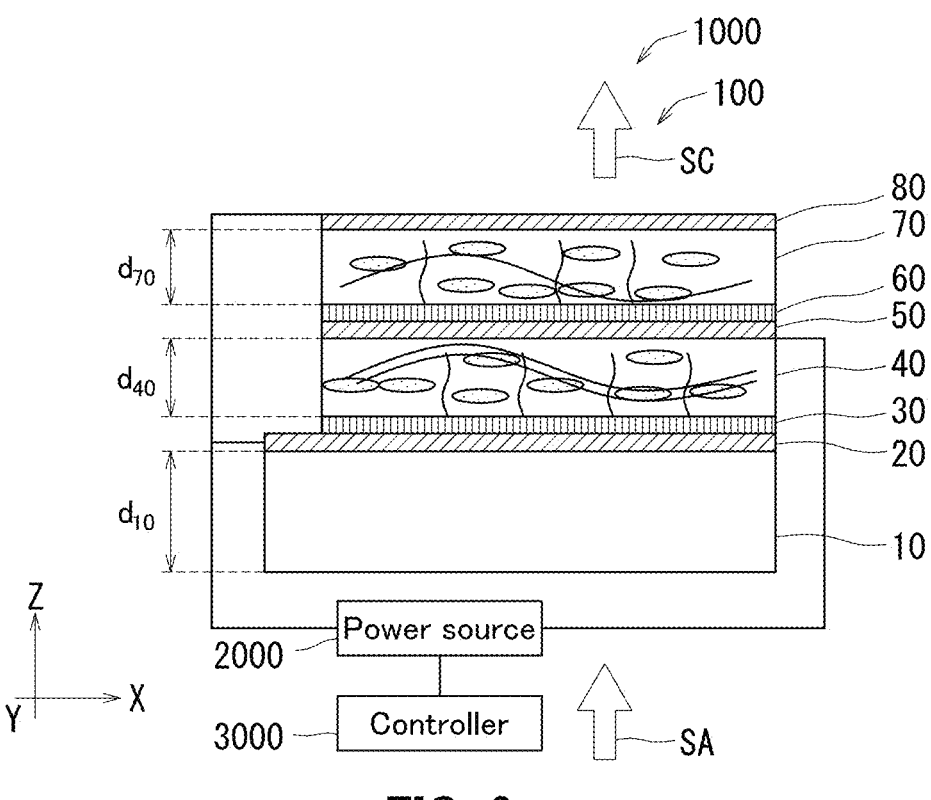
FIG. 2 is a cross-sectional view of the liquid crystal device according to the first embodiment.

FIGS. 1 and 2 are cross-sectional views of a liquid crystal device 1000 according to a first embodiment of the present invention. FIG. 1 is a cross-sectional view of the liquid crystal device 1000 in a first state. FIG. 2 is a cross-sectional view of the liquid crystal device 1000 in a second state. As illustrated in FIGS. 1 and 2, a liquid crystal element 100 is an optical element.

The liquid crystal element 100 is switched to either the first state or the second state. Voltage is applied to the liquid crystal element 100 in the first state. In the first state, light SA with a wavelength NA enters the liquid crystal element 100, and the liquid crystal element 100 emits first light SB. In the second state by contrast, no voltage is applied to the liquid crystal element 100. The light SA with a wavelength NA enters the liquid crystal element 100, and the liquid crystal element 100 emits second light SC. The first light SB differs from the second light SC. For example, the first light SB may differ from the second light SC in phase, wavelength, amount of light, polarization state, or direction of travel. Note that the state of the liquid crystal element 100 may be continuously switched between the first state and the second state. Alternatively, the state of the liquid crystal element 100 may be switched stepwise between the first state and the second state.

Specifically, the liquid crystal device 1000 includes a liquid crystal element 100, a power source 2000, and a controller 3000.

The controller 3000 controls the power source 2000. The controller 3000 is a computer or an integrated drive circuit, for example.

The power source 2000 applies voltage to the liquid crystal element 100. Under control of the controller 3000, the power source 2000 applies voltage to the liquid crystal element 100 at predetermined timing. The power source 2000 is an alternating current power source, for example.

The liquid crystal element 100 includes a first electrode 20, a first liquid crystal layer 40, a second electrode 50, a second liquid crystal layer 70, and a third electrode 80. The first electrode 20, the first liquid crystal layer 40, the second electrode 50, the second liquid crystal layer 70, and the third electrode 80 are stacked in the stated order in a Z direction. The Z direction is an example of a "predetermined direction". In other words, the first liquid crystal layer 40 is placed between the first electrode 20 and the second electrode 50. The second liquid crystal layer 70 is placed between the third electrode 80 and the second electrode 50.

The first liquid crystal layer 40 contains a plurality of (e.g., many) first liquid crystal molecules. The first liquid crystal molecules are nematic liquid crystals, for example. The molecular orientation of the first liquid crystal molecules can be such that the first liquid crystal molecules lie horizontally in the first state and stand vertically in the second state, or vice versa: they stand vertically in the first state and lie horizontally in the second state. For example, the plurality of first liquid crystal molecules are aligned in the Z direction in the first state and aligned in a direction across the Z direction in the second state. The first liquid crystal layer 40 has a substantially flat plate shape, for example. An amount $\Delta\varphi_{40}$ of optical phase modulation of light passing through the first liquid crystal layer 40 is in proportion to a thickness $d_{40}$ of the first liquid crystal layer 40 in the Z direction. In other words, the larger the thickness $d_{40}$, the larger the amount $\Delta\varphi_{40}$ of optical phase modulation. In reverse, the smaller the $d_{40}$, the smaller the amount $\Delta\varphi_{40}$ of optical phase modulation.

The second liquid crystal layer 70 contains a plurality of (e.g., many) second liquid crystal molecules. The second liquid crystal molecules may be the same as or different from the first liquid crystal molecules, and are nematic liquid crystals, for example. The molecular orientation of the second liquid crystal molecules can be such that the second liquid crystal molecules lie horizontally in the first state and stand vertically in the second state, or vice versa: they stand vertically in the first state and lie horizontally in the second state. For example, the plurality of second liquid crystal molecules are aligned in the Z direction in the first state and aligned in a direction across the Z direction in the second state. The second liquid crystal layer 70 has a substantially flat plate shape, for example. An amount $\Delta\varphi_{70}$ of optical phase modulation of light passing through the second liquid crystal layer 70 is in proportion to a thickness $d_{70}$ of the second liquid crystal layer 70 in the Z direction. The second liquid crystal layer 70 has a thickness do that may be the same as or different from the thickness $d_{40}$ of the first liquid crystal layer 40.

For example, it is required that an amount $\Delta\varphi$ of phase modulation of light is $\pi$ when the liquid crystal device 1000 is used as a deflection switch for laser radar use, and it is required that the amount $\Delta\varphi$ of phase modulation of light is $2\pi$ when the liquid crystal device 1000 is used as a liquid crystal lens. Light passes through the first liquid crystal layer 40 and the second liquid crystal layer 70 in the liquid crystal element 100. Therefore, the amount $\Delta\varphi$ of phase modulation of the light is the total of the amount $\Delta\varphi_{40}$ of optical phase modulation and the amount $\Delta\varphi_{70}$ of optical phase modulation.

The first liquid crystal layer 40 further contains first macromolecules. The first macromolecules form a three-dimensional network structure (polymer network) in the first liquid crystal layer 40. Any known and commonly used macromolecules can be used as the first macromolecules. Polymer networks can change in structure (morphology) according to for example the amount of the macromolecules or their compatibility with liquid crystal. In the present invention, the polymer network may be a relatively low-density structure where the polymer network is intertwined with the liquid crystals or a structure where the liquid crystals are present in a droplet-like fashion in a high-density polymeric matrix. On the assumption that the liquid crystal layer containing the first macromolecules and a liquid crystal layer not containing the first macromolecules have the same thickness, the voltage applied to the liquid crystal layer containing the first macromolecules is higher than the voltage applied to the liquid crystal layer not containing the first macromolecules, whereas the response speed of the first liquid crystal molecules in the liquid crystal layer containing the first macromolecules to voltage application is approximately 10 times greater than that in the liquid crystal layer not containing the first macromolecules. In other words, the plurality of first liquid crystal molecules in the liquid crystal layer containing the first macromolecules are allowed to respond within sub-milliseconds.

The second liquid crystal layer 70 further contains second macromolecules. The second macromolecules may be the same as or different from the first macromolecules, and form a three-dimensional network structure in the second liquid crystal layer 70. On the assumption that the liquid crystal layer containing the second macromolecules and a liquid crystal layer not containing the second macromolecules have the same thickness, the voltage applied to the liquid crystal layer containing the second macromolecules is higher than the voltage applied to the liquid crystal layer not containing the second macromolecules, whereas the response speed of the second liquid crystal molecules in the liquid crystal layer containing the second macromolecules to voltage application is approximately 10 times greater than that in the liquid crystal layer not containing the second macromolecules. In other words, the plurality of second liquid crystal molecules in the liquid crystal layer containing the second macromolecules are allowed to respond within sub-milliseconds.

The first electrode 20 has conductivity and light transmittance. The shape of the first electrode 20 is not limited particularly, and may be in the shape of stripes, meshes, or a random grit pattern. Examples of the material of the first electrode 20 include poly(3,4-ethylenedioxythiophene) (PEDOT), polystyrene sulfonic acid (PSS), Ag, indium tin oxide (ITO), indium zinc oxide (IZO), and indium zinc tin oxide (IZTO) each being a conductive polymer.

The second electrode 50 has conductivity and light transmittance. The shape of the second electrode 50 is not limited particularly, and may be in the shape of stripes, meshes, or a random grit pattern. Examples of the material of the second electrode 50 include poly(3,4-ethylenedioxythiophene) (PEDOT), polystyrene sulfonic acid (PSS), Ag, ITO, IZO, and IZTO each being a conductive polymer.

The third electrode 80 has conductivity and light transmittance. The shape of the third electrode 80 is not limited particularly, and may be in the shape of stripes, meshes, or a random grit pattern. Examples of the material of the third electrode 80 include poly(3,4-ethylenedioxythiophene) (PEDOT), polystyrene sulfonic acid (PSS), Ag, ITO, IZO, and IZTO each being a conductive polymer.

For example, the controller 3000 keeps the first electrode 20 and the third electrode 80 at a first potential V1 while keeping the second electrode 50 at a second potential V2 in the first state. The first potential V1 differs from the second potential V2. Specifically, the power source 2000 applies the first potential V1 to the first electrode 20 and the third electrode 80 and applies the second potential V2 to the second electrode 50. As a result, voltage (V1–V2), which is a difference between the first potential V1 and the second potential V2, is applied between the first electrode 20 and the second electrode 50. Accordingly, an electric field (V1–V2)/$d_{40}$ is applied to the interior of the first liquid crystal layer 40. As a result, the orientation of the plurality of first liquid crystal molecules is changed by the electric field (V1–V2)/

$d_{40}$. Note that when the first electrode 20 is in the shape of stripes, an electric field corresponding to the stripes is applied to the interior of the first liquid crystal layer 40.

The voltage (V1−V2), which is the difference between the first potential V1 and the second potential V2, is also applied between the third electrode 80 and the second electrode 50. Accordingly, an electric field (V1−V2)/$d_{70}$ is formed in the interior of the second liquid crystal layer 70. As a result, the orientation of the plurality of second liquid crystal molecules is changed by the electric field (V1−V2)/$d_{70}$. Note that when the third electrode 80 is in the shape of stripes, an electric field corresponding to the stripes may be applied to the interior of the second liquid crystal layer 70.

As has been described so far with reference to FIG. 1, the liquid crystal element 100 according to the first embodiment includes a first liquid crystal layer 40 and a second liquid crystal layer 70. In the above configuration, the thickness $d_{40}$ of the first liquid crystal layer 40 and the thickness dro of the second liquid crystal layer 70 can be reduced. In other words, the distance $d_{40}$ between the first electrode 20 and the second electrode 50 is reduced. This can change the orientation of the plurality of first liquid crystal molecules even when the potential difference (V1−V2) between the first electrode 20 and the second electrode 50 is reduced. Furthermore, the distance do between the third electrode 80 and the second electrode 50 is reduced, with a result that the orientation of the plurality of second liquid crystal molecules can be changed even when the potential difference (V1−V2) between the third electrode 80 and the second electrode 50 is reduced.

Here, the liquid crystal device 1000 is described in detail. The liquid crystal element 100 further includes a first alignment film 30 and a second alignment film 60. The first electrode 20, the first alignment film 30, the first liquid crystal layer 40, the second electrode 50, the second alignment film 60, the second liquid crystal layer 70, and the third electrode 80 are stacked in the stated order in the Z direction.

The first alignment film 30 defines the orientation of the plurality of first liquid crystal molecules. Specifically, the first alignment film 30 defines the orientation of the plurality of first liquid crystal molecules in the second state. The first alignment film 30 has a substantially flat plate shape, for example. The first alignment film 30 has a thickness in the Z direction of 100 nm, for example. The material of the first alignment film 30 is polyimide, for example.

The second alignment film 60 defines the orientation of the plurality of second liquid crystal molecules. Specifically, the second alignment film 60 defines the orientation of the plurality of second liquid crystal molecules in the second state. The second alignment film 60 has a substantially flat plate shape, for example. The second alignment film 60 has a thickness in the Z direction of 100 nm, for example. The material of the second alignment film 60 is polyimide, for example.

As described above, the liquid crystal element 100 according to the first embodiment further includes a first alignment film 30 and a second alignment film 60. In the above configuration, the orientation of the plurality of first liquid crystal molecules and the orientation of the plurality of second liquid crystal molecules can be defined.

The liquid crystal element 100 further includes a first substrate 10. The first substrate 10, the first electrode 20, the first alignment film 30, the first liquid crystal layer 40, the second electrode 50, the second alignment film 60, the second liquid crystal layer 70, and the third electrode 80 are stacked in the stated order in the Z direction in the liquid crystal element 100.

The first substrate 10 has a substantially flat plate shape, for example. The first substrate 10 has a thickness $d_{10}$ in the Z direction of 0.7 mm, for example. The first substrate 10 has light transmittance. Specifically, the material of the first substrate 10 is glass or plastic. The plastic is preferably an optical resin with low birefringence, and the example of the plastic include cellulose derivatives, polyolefin, polyester, polyolefin, polycarbonate, polyacrylate, polyarylate, polyether sulfone, polyimide, polyphenylene sulfide, polyphenylene ether, nylon, and polystyrene.

Subsequently, a method for producing the liquid crystal element 100 using the first substrate 10 is described with reference to FIGS. 3A to 5B. FIGS. 3A to 5B are cross-sectional views for depicting the method for producing the liquid crystal element 100.

Figure 3A:
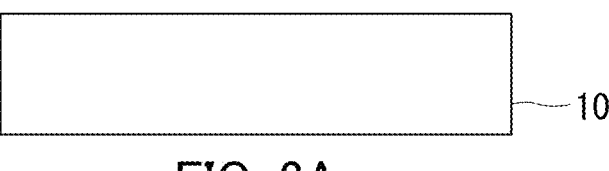
FIGS. 3A to 3E are cross-sectional views for depicting a method for producing the liquid crystal element according to the first embodiment.

As illustrated in FIG. 3A, the first substrate 10 is prepared first.

Figure 3B:
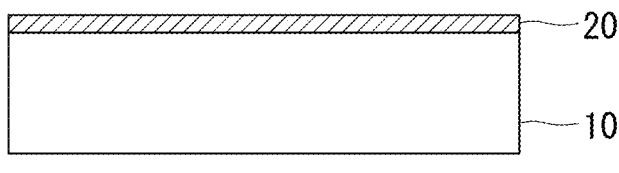

Next, the first electrode 20 is formed on the first substrate 10 as illustrated in FIG. 3B. For example, PEDOT, Ag, ITO, IZO, or IZTO, each of which is a conductive polymer, may be applied or deposited onto the first substrate 10.

Figure 3C:
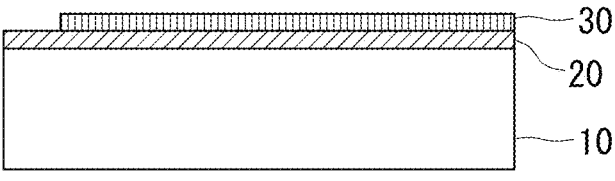

Next, the first alignment film 30 is formed on the first electrode 20 as illustrated in FIG. 3C. For example, a first alignment agent solution is applied onto the first electrode 20. For example, the first alignment agent solution contains polyimide and a solvent for dissolving the polyimide or contains an aqueous solution of a water-soluble polymer, such as polyvinyl alcohol. The solvent is an organic solvent, for example, dimethyl formamide specifically. Examples of the method for applying the first alignment agent solution include known and commonly used methods such as a method using an applicator, spin coating, bar coating, roll coating, direct gravure coating, reverse gravure coating, ink-jetting, die coating, and cap coating. Note that the first alignment film 30 may be uniaxially orientated by irradiating the first alignment film 30 with linearly polarized light.

Figure 3D:
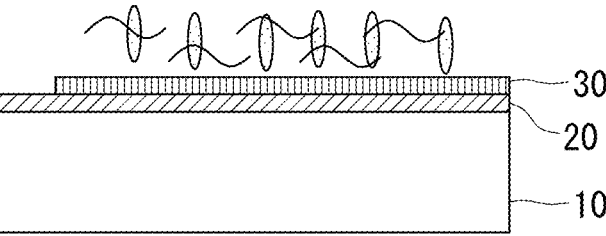

As illustrated in FIG. 3D, a first liquid crystal solution is applied onto the first alignment film 30 next. The first liquid crystal solution contains a plurality of (many) monomers, a polymerization initiator, and a plurality of (many) first liquid crystal molecules. The plurality of monomers each are a liquid crystal monomer or a non-liquid crystal monomer, for example. The solvent is an organic solvent, for example. Specific examples of the solvent include methyl ethyl ketone, toluene, propylene glycol monomethyl ether acetate (PGMEA), cyclohexanone, methyl isobutyl ketone, dimethylacetamide, dimethylformamide, and cyclopentanone. Examples of the method for applying the first liquid crystal solution include known and commonly used methods such as a method using an applicator, spin coating, bar coating, roll coating, direct gravure coating, reverse gravure coating, ink-jetting, die coating, and cap coating. Note that the first liquid crystal solution may further contain a solvent and a surface conditioning agent. The surface conditioning agent conditions the surface of the first liquid crystal layer 40 in formation of the first liquid crystal layer 40. Specifically, the surface conditioning agent smooths the surface of the first liquid crystal layer 40.

Figure 3E:
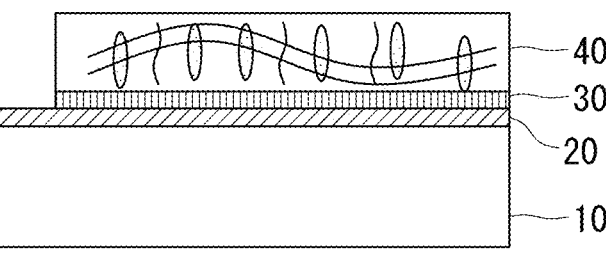

As illustrated in FIG. 3E, polymerization of the plurality of monomers is caused next to form macromolecules forming three-dimensional network structure, thereby forming the first liquid crystal layer 40. The method for polymerizing the plurality of monomers is selected as appropriate according to use of the liquid crystal element, and may be irradiation of active energy rays or thermal polymerization, for example. Specifically, the plurality of monomers are polymerized by irradiating the polymerization initiator with ultraviolet rays.

Figure 4A:
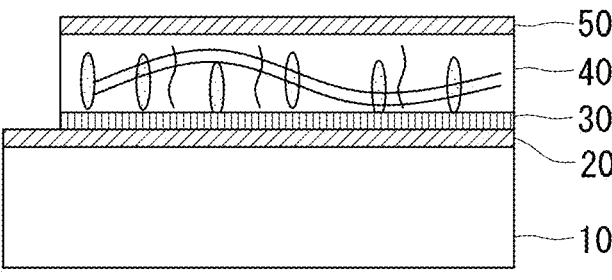
FIGS. 4A to 4C are cross-sectional views for depicting the method for producing the liquid crystal element according to the first embodiment.

Next, the second electrode 50 is formed on the first liquid crystal layer 40 as illustrated in FIG. 4A. For example, PEDOT, Ag, ITO, IZO, or IZTO, each of which is a conductive polymer, may be applied or deposited onto the first liquid crystal layer 40.

Figure 4B:
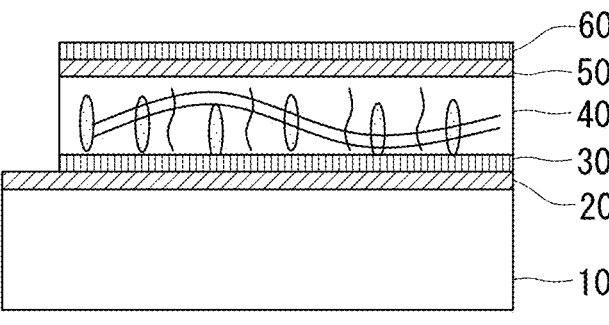

Next, the second alignment film 60 is formed on the second electrode 50 as illustrated in FIG. 4B. For example, a second alignment agent solution is applied onto the first electrode 20. For example, the second alignment agent solution contains polyimide and a solvent for dissolving the polyimide or contains an aqueous solution of a water-soluble polymer, such as polyvinyl alcohol. The solvent is an organic solvent, for example, dimethyl formamide specifically. The method for applying the second alignment agent solution is the same as the method for applying the first alignment agent solution. Note that the second alignment film 60 may be uniaxially orientated by irradiating the second alignment film 60 with linearly polarized light.

Figure 4C:
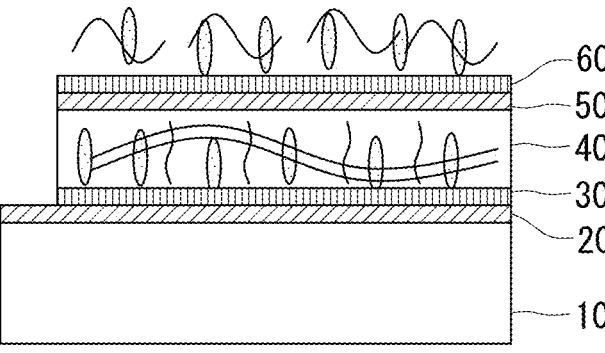

As illustrated in FIG. 4C, a second liquid crystal solution is applied onto the second alignment film 60 next. The second liquid crystal solution contains a plurality of (many) monomers, a polymerization initiator, and a plurality of (many) second liquid crystal molecules. The plurality of monomers each are a liquid crystal monomer or a non-liquid crystal monomer, for example. A solvent is an organic solvent, for example. Specific examples of the solvent include methyl ethyl ketone, toluene, propylene glycol monomethyl ether acetate (PGMEA), cyclohexanone, methyl isobutyl ketone, dimethylacetamide, dimethyl formamide, and cyclopentanone. The method for applying the second liquid crystal solution is the same as the method for applying the first liquid crystal solution. Note that the second liquid crystal solution may further contain a solvent and a surface conditioning agent. The surface conditioning agent conditions the surface of the second liquid crystal layer 70 in formation of the second liquid crystal layer 70. Specifically, the surface conditioning agent smooths the surface of the second liquid crystal layer 70.

Figure 5A:
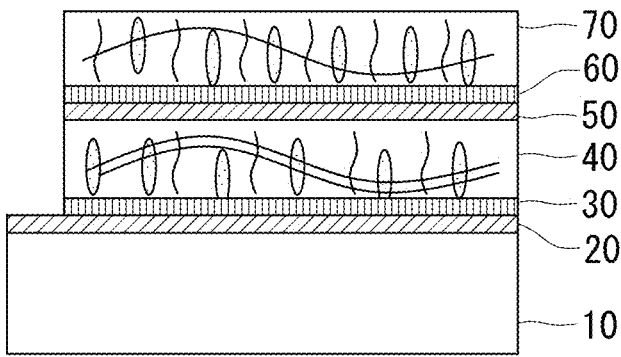
FIGS. 5A and 5B are cross-sectional views for depicting the method for producing the liquid crystal element according to the first embodiment.

As illustrated in FIG. 5A, polymerization of the plurality of monomers is caused next to form macromolecules forming a three-dimensional network structure, thereby forming the second liquid crystal layer 70. The method for polymerizing the plurality of monomers is selected as appropriate according to use of the liquid crystal element, and may be irradiation of active energy rays or thermal polymerization, for example. Specifically, the plurality of monomers are polymerized by irradiating the polymerization initiator with ultraviolet rays.

Figure 5B:
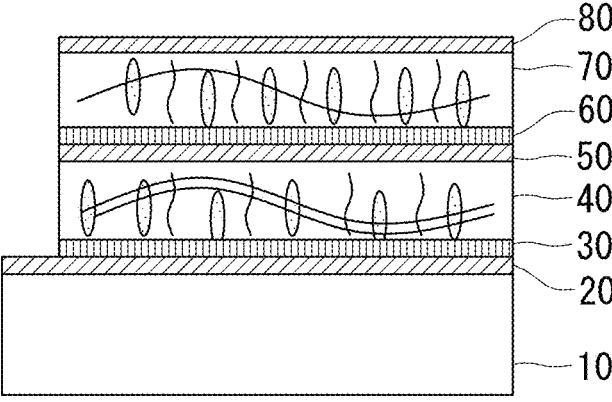

Next, the third electrode 80 is formed on the second liquid crystal layer 70 as illustrated in FIG. 5B. For example, PEDOT, Ag, ITO, IZO, or IZTO, each of which is a conductive polymer, may be applied or deposited onto the second liquid crystal layer 70.

As has been described so far with reference to FIGS. 3A to 5B, the liquid crystal layers are formed by applying the liquid crystal solutions in the method for producing the liquid crystal element 100 of the first embodiment. As a result, the thickness $d_{40}$ of the first liquid crystal layer 40 and the thickness $d_{70}$ of the second liquid crystal layer 70 can be reduced. In detail, the thickness $d_{40}$ of the first liquid crystal layer 40 and the thickness dzo of the second liquid crystal layer 70 can be easily reduced compared to the thickness of a liquid crystal layer formed by sealing a liquid crystal solution between a glass substrate and a glass substrate.

For example, the liquid crystal device 1000 such as above can be used as building materials, light control glass, smart windows for vehicles, light control units in organic EL displays, and light modulators for controlling the phase, wavefront, or polarization of light. Specifically, the liquid crystal device 1000 can be used as, for example: architectural light control elements such as windows, skylights, roofs, walls, dividers, partitions, and doors; transportation light control elements such as doors, windows, movable barriers, helmets, and sunroofs; decorative light control elements such as sunglasses, glasses, sun visors, clocks, mirrors, and reflectors; display members such as flexible liquid crystal display elements, reflective liquid crystal display elements, transparent liquid crystal display elements, and variable diffusion films; electro-optic phase modulators; spatial light modulators; optical communication filters; and optical deflectors.

As an application example, the element can be produced in different ways to make significant differences in scattering properties between the first state and the second state or in inducing phase modulation of the light wave with high transparency maintained. Such differentiation can be achieved by changing the type of macromolecules (macromolecules polymerized from liquid crystal monomers or macromolecules polymerized from non-liquid crystal monomer polymerization) or by adjusting the size or composition of the network structure during production of the element. Where the network structure spans several hundreds of nanometers or more, for example, the light scattering properties (transmittance) changes between the first state and the second state. This enables the liquid crystal element 100 to be used as light modulation glass or similar applications. Furthermore, when using liquid crystal monomers, the liquid crystal element 100 can function as an element that does not scatter light when no voltage is applied and that scatters light when voltage is applied. Alternatively, when using non-liquid crystal monomers, the liquid crystal element 100 can function as an element that scatters light when no voltage is applied and that does not scatter light when voltage is applied. In addition, where the network structure spans 100 nm or less, phase modulation is performed while maintaining high transmittance, thereby enabling its application to display elements or phase modulation elements.

Second Embodiment

Figure 6:
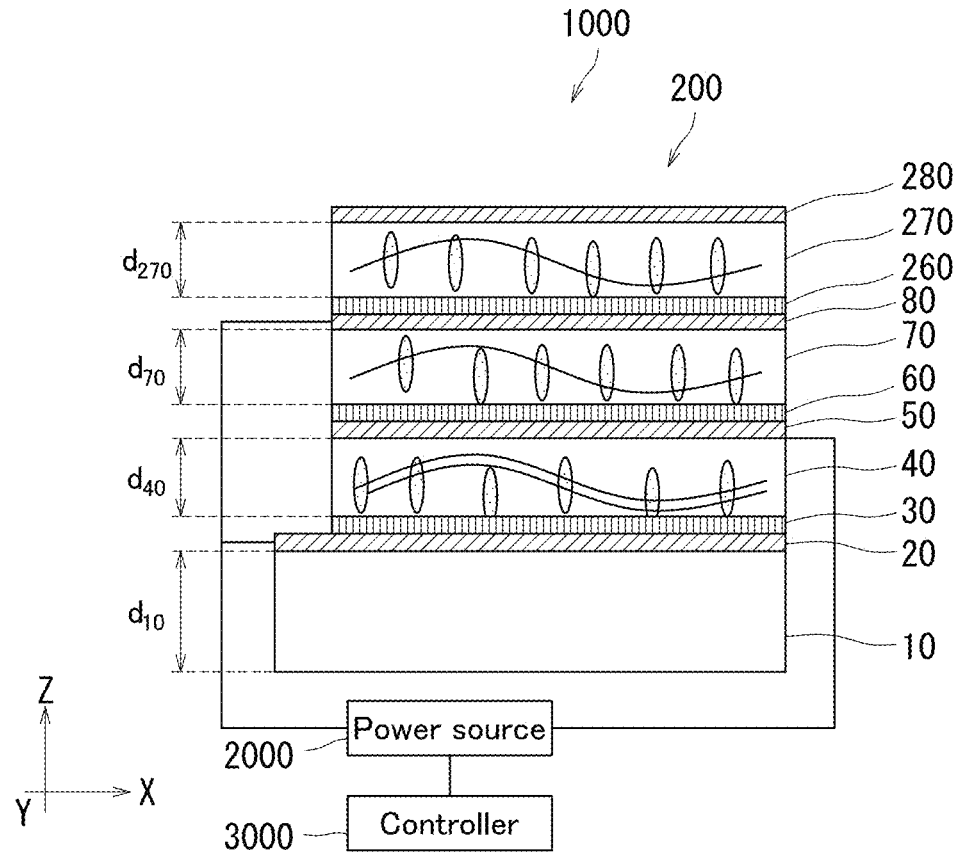
FIG. 6 is a cross-sectional view of a liquid crystal device according to a second embodiment of the present invention.

With reference to FIG. 6, a liquid crystal device 1000 according to a second embodiment of the present invention is described. FIG. 6 is a cross-sectional view of the liquid crystal device 1000 according to the second embodiment of the present invention. A liquid crystal element 200 according to the second embodiment differs from the liquid crystal element 100 according to the first embodiment described with reference to FIGS. 1 to 5B by providing three liquid crystal layers. The following primarily describes the differences of the second embodiment from the first embodiment.

As illustrated in FIG. 6, the liquid crystal device 1000 includes a liquid crystal element 200, a power source 2000, and a controller 3000.

The liquid crystal element 200 includes a first substrate 10, a first electrode 20, a first alignment film 30, a first liquid crystal layer 40, a second electrode 50, a second alignment film 60, a second liquid crystal layer 70, a third electrode 80, a third alignment film 260, a third liquid crystal layer 270, and a fourth electrode 280. The first substrate 10, the first electrode 20, the first alignment film 30, the first liquid crystal layer 40, the second electrode 50, the second alignment film 60, the second liquid crystal layer 70, the third electrode 80, the third alignment film 260, the third liquid crystal layer 270, and the fourth electrode 280 are stacked in the stated order in the Z direction. Note that a protection film (obtained by organic film application or inorganic film deposition) may be provided on the fourth electrode 280.

The third liquid crystal layer 270 contains a plurality of (e.g., many) third liquid crystal molecules. The third liquid crystal molecules may be the same as or different from the first liquid crystal molecules, and are nematic liquid crystals, for example. The third liquid crystal layer 270 has a substantially flat plate shape, for example. An amount $\Delta\varphi_{270}$ of phase modulation of light passing through the third liquid crystal layer 270 is in proportion to a thickness $d_{270}$ of the third liquid crystal layer 270 in the Z direction. The thickness $d_{270}$ of the third liquid crystal layer 270 may be the same as or different from the thickness $d_{40}$ of the first liquid crystal layer 40.

Light passes through the first liquid crystal layer 40, the second liquid crystal layer 70, the third liquid crystal layer 270 in the liquid crystal element 200. As such, the amount $\Delta\varphi$ of phase modulation of the light is the total value of the amount $\Delta\varphi_{40}$ of phase modulation, the amount $\Delta\varphi_{70}$ of phase modulation, and the amount $\Delta\varphi_{270}$ of phase modulation. In other words, the thickness of liquid crystal layers can be reduced further as the number of the liquid crystal layers is increased.

The third liquid crystal layer 270 further contains third macromolecules. The third macromolecules may be the same as or different from the first macromolecules, and form a three-dimensional network structure in the third liquid crystal layer 270. On the assumption that a liquid crystal layer containing the third macromolecules and a liquid crystal layer not containing the third macromolecules have the same thickness, the voltage applied to the liquid crystal layer containing the third macromolecules is higher than the voltage applied to the liquid crystal layer not containing the third macromolecules, whereas the response speed of the plurality of third liquid crystal molecules in the liquid crystal layer containing the third macromolecules is approximately 10 times greater than that of the liquid crystal layer not containing the third macromolecules. In other words, the plurality of third liquid crystal molecules can respond within sub-milliseconds.

The fourth electrode 280 has conductivity and light transmittance. The shape of the fourth electrode 280 is not limited particularly, and may be in the shape of stripes, meshes, or a random grit pattern. Examples of the material of the fourth electrode 280 include PEDOT, Ag, ITO, IZO, and IZTO each being a conductive polymer.

The third alignment film 260 defines the orientation of the plurality of third liquid crystal molecules. Specifically, the third alignment film 260 defines the orientation of the plurality of third liquid crystal molecules in the second state. The third alignment film 260 has a substantially flat plate shape, for example. The third alignment film 260 has a thickness in the Z direction of 100 nm, for example. The material of the third alignment film 260 is polyimide, for example.

For example, in the first state, the first electrode 20 and the third electrode 80 are kept at a first potential V1' while the second electrode 50 and the fourth electrode 280 are kept at a second potential V2'. The first potential V1' differs from the second potential V2'. Specifically, the power source 2000 applies the first potential V1' to the first electrode 20 and the third electrode 80 while applying the second potential V2' to the second electrode 50 and the fourth electrode 280. As a result, voltage (V1'–V2'), which is a difference between the first potential V1' and the second potential V2', is applied between the first electrode 20 and the second electrode 50. Accordingly, an electric field (V1'–V2')/$d_{40}$ is applied to the interior of the first liquid crystal layer 40. As a result, the orientation of the plurality of first liquid crystal molecules is changed by the electric field (V1'–V2')/$d_{40}$.

Furthermore, voltage (V1'–V2'), which is the difference between the first potential V1' and the second potential V2', is applied between the third electrode 80 and the second electrode 50. Accordingly, an electric field (V1'–V2')/$d_{70}$ is formed in the interior of the second liquid crystal layer 70. As a result, the orientation of the plurality of second liquid crystal molecules is changed by the electric field (V1'–V2')/$d_{70}$. Furthermore, voltage (V1'–V2'), which is the difference between the first potential V1' and the second potential V2', is applied between the third electrode 80 and the fourth electrode 280. Accordingly, an electric field (V1–V2)/$d_{70}$ is applied to the interior of the third liquid crystal layer 270. As a result, the orientation of the plurality of third liquid crystal molecules is changed by the electric field (V1'–V2')/$d_{270}$.

As has been described so far with reference to FIG. 6, the liquid crystal element 100 according to the second embodiment includes a first liquid crystal layer 40, a second liquid crystal layer 70, and a third liquid crystal layer 270. In the above configuration, the thickness $d_{40}$ of the first liquid crystal layer 40, the thickness $d_{70}$ of the second liquid crystal layer 70, and the thickness $d_{270}$ of the third liquid crystal layer 270 can be further reduced. Therefore, orientation of the plurality of liquid crystal molecules can be changed even when the potential difference (V1'–V2') is further reduced.

Third Embodiment

Figure 7:
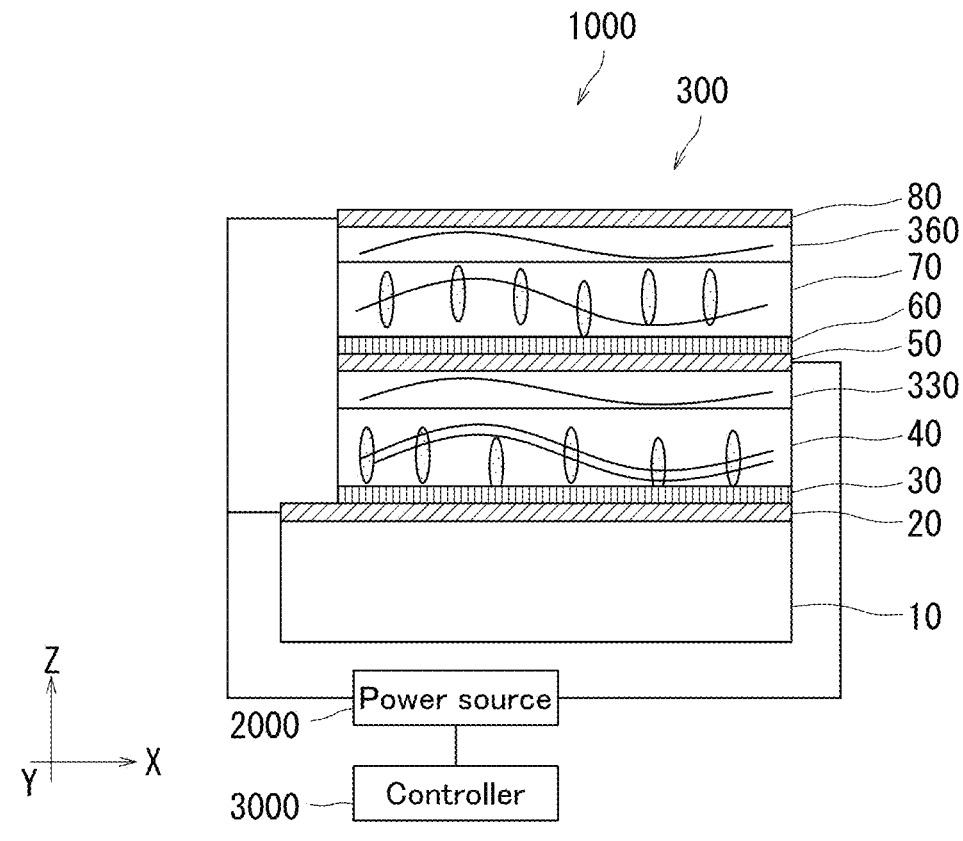
FIG. 7 is a cross-sectional view of a liquid crystal device according to a third embodiment of the present invention.

With reference to FIG. 7, a liquid crystal device 1000 according to a third embodiment of the present invention is described. FIG. 7 is a cross-sectional view of the liquid crystal device 1000 according to the third embodiment of the present invention. A liquid crystal element 300 according to the third embodiment differs from the liquid crystal element 100 according to the first embodiment described with reference to FIGS. 1 to 5B by providing a buffer layer. The following primarily describes the differences of the third embodiment from the first embodiment.

As illustrated in FIG. 7, the liquid crystal device 1000 includes a liquid crystal element 300, a power source 2000, and a controller 3000.

The liquid crystal element 200 includes a first substrate 10, a first electrode 20, a first alignment film 30, a first liquid crystal layer 40, a first buffer layer 330, a second electrode 50, a second alignment film 60, a second liquid crystal layer 70, a second buffer layer 360, and a third electrode 80. The first substrate 10, the first electrode 20, the first alignment film 30, the first liquid crystal layer 40, the first buffer layer 330, the second electrode 50, the second alignment film 60, the second liquid crystal layer 70, the second buffer layer 360, and the third electrode 80 are stacked in the stated order in the Z direction.

The first buffer layer 330 is placed between the first liquid crystal layer 40 and the second electrode 50. In detail, the first buffer layer 330 is bonded to the first liquid crystal layer 40. The first buffer layer 330 is bonded to the second electrode 50. The first buffer layer 330 has a substantially flat plate shape, for example. The first buffer layer 330 has a thickness in the Z direction of 0.2 µm, for example. Specifically, the first buffer layer 330 contains fourth macromolecules. Examples of the fourth macromolecules include ultraviolet-curable resins, polymerizable liquid crystals, liquid crystal layers with few liquid crystal components, polyvinyl alcohol, and silicon dioxide. For example, the first buffer layer 330 is formed by applying a first buffer solution onto the first liquid crystal layer 40. Note that the first buffer layer 330 may be placed between the second electrode 50 and the second alignment film 60.

The second buffer layer 360 is placed between the second liquid crystal layer 70 and the third electrode 80. In detail, the second buffer layer 360 is bonded to the second liquid crystal layer 70. The second buffer layer 360 is bonded to the third electrode 80. The second buffer layer 360 has a substantially flat plate shape, for example. The second buffer layer 360 has a thickness in the Z direction of 0.2 μm, for example. Specifically, the second buffer layer 360 contains fifth macromolecules. Examples of the fifth macromolecules include ultraviolet curing resins, polymerizable liquid crystals, liquid crystal layers with few liquid crystal components, polyvinyl alcohol, and silicon dioxide. For example, the second buffer layer 360 is formed by applying a second buffer solution onto the second liquid crystal layer 70. Note that the second buffer layer 360 may be placed on the third electrode 80.

As has been described so far with reference to FIG. 7, the liquid crystal element 300 according to the third embodiment includes a first buffer layer 330 and a second buffer layer 360. In the above configuration, peeling off of the second electrode 50 or the third electrode 80 can be inhibited.

Fourth Embodiment

Figure 8:
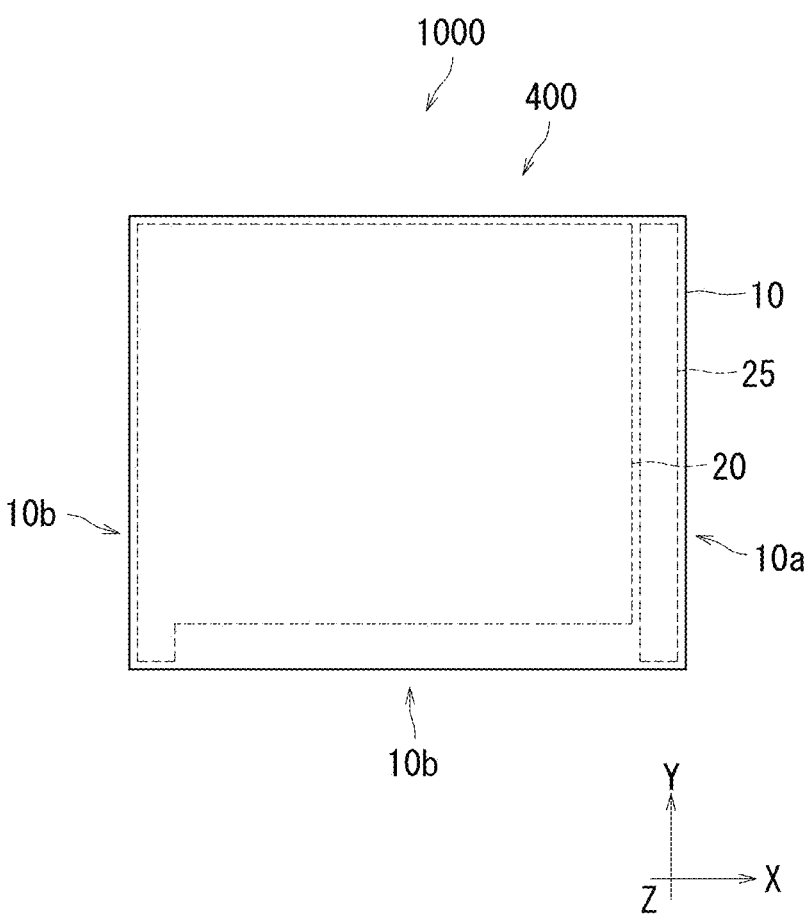
FIG. 8 is a plan view of a liquid crystal device according to a fourth embodiment of the present invention.
Figure 9:
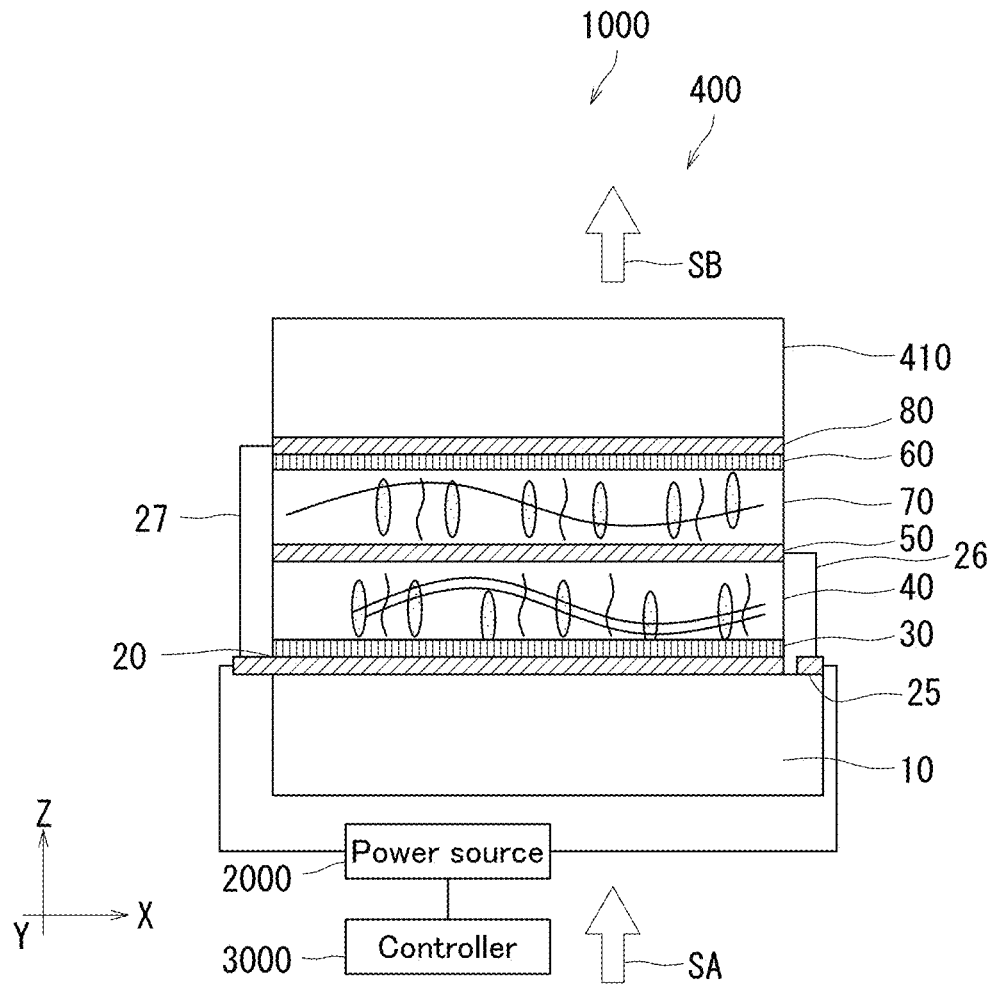
FIG. 9 is a cross-sectional view of the liquid crystal device according to the fourth embodiment.

With reference to FIGS. 8 and 9, a liquid crystal device 1000 according to a fourth embodiment of the present invention is described. FIG. 8 is a plan view of the liquid crystal device 1000 according to the fourth embodiment of the present invention. FIG. 9 is a cross-sectional view of the liquid crystal device 1000 according to the fourth embodiment of the present invention. FIG. 9 illustrates a section of the liquid crystal device 1000 in parallel to an XZ plane. A liquid crystal element 400 according to the fourth embodiment differs from the liquid crystal element 100 according to the first embodiment described with reference to FIGS. 1 to 5B by providing a second substrate. The following primarily describes the differences of the fourth embodiment from the first embodiment.

As illustrated in FIGS. 8 and 9, the liquid crystal device 1000 includes a liquid crystal element 400, a power source 2000, and a controller 3000.

The liquid crystal element 400 includes a first substrate 10, a first electrode 20, a first alignment film 30, a first liquid crystal layer 40, a second electrode 50, a second liquid crystal layer 70, a second alignment film 60, a third electrode 80, a second substrate 410, and an auxiliary electrode 25. The first substrate 10, the first electrode 20, the first alignment film 30, the first liquid crystal layer 40, the second electrode 50, the second liquid crystal layer 70, the second alignment film 60, the third electrode 80, and the second substrate 410 are stacked in the stated order in the Z direction. In other words, the first electrode 20, the first liquid crystal layer 40, the second electrode 50, the second liquid crystal layer 70, and the third electrode 80 are placed between the first substrate 10 and the second substrate 410.

The second substrate 410 has a substantially flat plate shape, for example. The second substrate 410 has a thickness $d_{410}$ in the Z direction of 0.7 mm, for example. The second substrate 410 has light transmittance. Specifically, the material of the second substrate 410 is glass or plastic. The plastic is preferably an optical resin with low birefringence, and the example of the plastic include cellulose derivatives, polyolefin, polyester, polyolefin, polycarbonate, polyacrylate, polyarylate, polyether sulfone, polyimide, polyphenylene sulfide, polyphenylene ether, nylon, and polystyrene.

The auxiliary electrode 25 is placed on the first substrate 10. The auxiliary electrode 25 is separated from the first electrode 20. Specifically, the auxiliary electrode 25 is placed in a first area 10a of the first substrate 10. The first area 10a is located on one side of the first substrate 10 in an X direction. The auxiliary electrode 25 has conductivity and light transmittance. The material of the auxiliary electrode 25 is the same as the material of the first electrode 20, for example. The auxiliary electrode 25 is connected to the second electrode 50 through a first wire 26.

The third electrode 80 is connected to the first electrode 20 through a second wire 27. The second wire 27 is wired in a second area 10b of the first substrate 10. The second area 10b is located on one side of the first substrate 10 in a negative X direction.

As has been described so far with reference to FIGS. 8 and 9, the first electrode 2, the first liquid crystal layer 40, the second electrode 50, the second liquid crystal layer 70, and the third electrode 80 are placed between the first substrate 10 and the second substrate 410. In the above configuration, the liquid crystal element 400 can be inhibited from being broken.

With reference to FIGS. 10A to 12, a method for producing the liquid crystal element 400 using the first substrate 10 and the second substrate 410 is described next. FIGS. 10A to 12 are cross-sectional views for depicting the method for producing the liquid crystal element 400. FIGS. 10A to 12 each illustrate a section of the liquid crystal element 400 in parallel to an XZ plane.

Figure 10A:
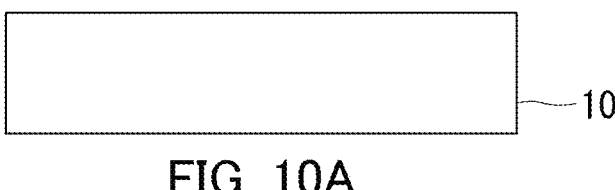
FIGS. 10A to 10E are cross-sectional views for depicting a method for producing the liquid crystal element according to the fourth embodiment.

As illustrated in FIG. 10A, the first substrate 10 is prepared first.

Figure 10B:
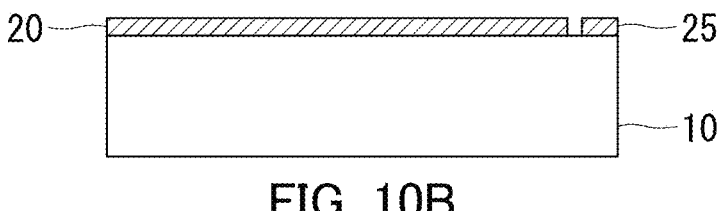

Next, the first electrode 20 and the auxiliary electrode 25 are formed on a first surface of the first substrate 10 as illustrated in FIG. 10B. The term first surface refers to a surface located on a side of a member in the Z direction. For example, PEDOT, Ag, ITO, IZO, or IZTO, each of which is a conductive polymer, may be applied or deposited onto the first surface of the first substrate 10.

Figure 10C:
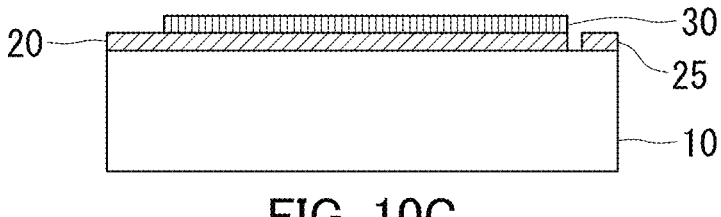

Next, the first alignment film 30 is formed on the first surface of the first electrode 20 as illustrated in FIG. 10C. For example, a first alignment agent solution is applied onto the first surface of the first electrode 20. For example, the first alignment agent solution contains polyimide and a solvent for dissolving the polyimide or contains an aqueous solution of a water-soluble polymer, such as polyvinyl alcohol. The solvent is an organic solvent, for example, dimethyl formamide specifically. Examples of the method for applying the first alignment agent solution include known and commonly used methods such as a method using an applicator, spin coating, bar coating, roll coating, direct gravure coating, reverse gravure coating, ink-jetting, die coating, and cap coating. Note that the first alignment film 30 may be uniaxially orientated by irradiation with linearly polarized light.

Figure 10D:
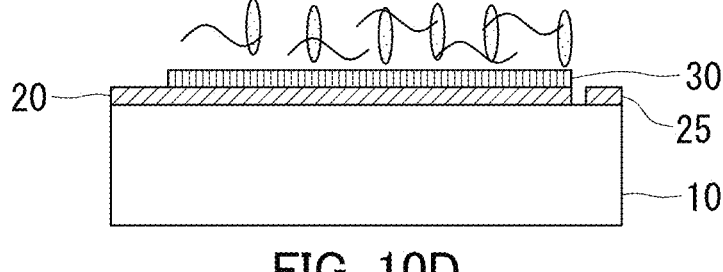

As illustrated in FIG. 10D, a first liquid crystal solution is applied onto a first surface of the first alignment film 30 next. The first liquid crystal solution contains a plurality of (many) monomers, a polymerization initiator, and a plurality of (many) first liquid crystal molecules. The plurality of monomers each are a liquid crystal monomer or a non-liquid crystal monomer, for example. The solvent is an organic solvent, for example. Specific examples of the solvent include methyl ethyl ketone, toluene, propylene glycol monomethyl ether acetate (PGMEA), cyclohexanone, methyl isobutyl ketone, dimethylacetamide, dimethylforma-mide, and cyclopentanone. Examples of the method for applying the first liquid crystal solution include known and commonly used methods such as a method using an appli-cator, spin coating, bar coating, roll coating, direct gravure coating, reverse gravure coating, ink-jetting, die coating, and cap coating.

Figure 10E:
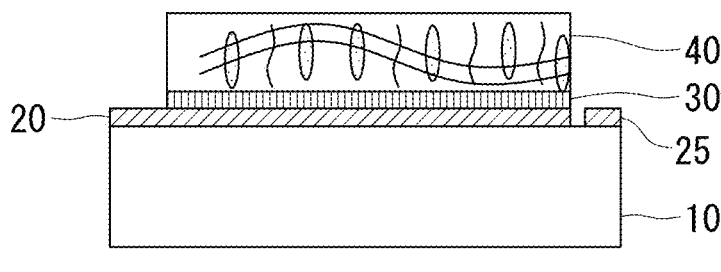

As illustrated in FIG. 10E, polymerization of the plurality of monomers is caused next to form macromolecules form-ing a three-dimensional network structure, thereby forming the first liquid crystal layer 40. For example, the plurality of monomers are polymerized by irradiating the polymeriza-tion initiator with ultraviolet rays. The method for polym-erizing the plurality of monomers is selected as appropriate according to use of the liquid crystal element and may be irradiation of active energy rays or thermal polymerization, for example. Specifically, the plurality of monomers are polymerized by irradiating the polymerization initiator with ultraviolet rays.

Figure 11A:
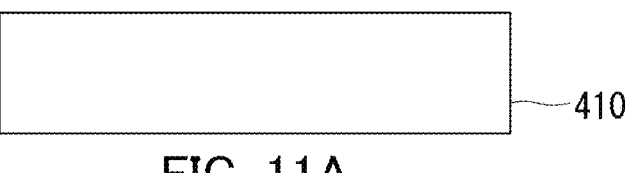
FIGS. 11A to 11E are cross-sectional views for depicting the method for producing the liquid crystal element according to the fourth embodiment.

As illustrated in FIG. 11A, the second substrate 410 is prepared next.

Figure 11B:
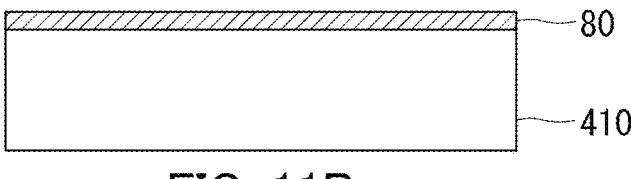

Next, the third electrode 80 is formed on a second surface of the second substrate 410 as illustrated in FIG. 11B. The term second surface refers to a surface located on a side of a member in a negative Z direction. For example, PEDOT, Ag, ITO, IZO, or IZTO, each of which is a conductive polymer, may be applied or deposited onto the second surface of the second substrate 410.

Figure 11C:
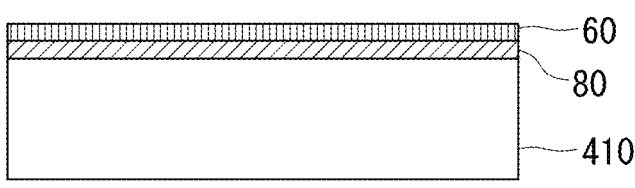

Next, the second alignment film 60 is formed on a second surface of the third electrode 80 as illustrated in FIG. 11C. For example, a second alignment agent solution is applied onto the second surface of the third electrode 80. For example, the second alignment agent solution contains poly-imide and a solvent for dissolving the polyimide or contains an aqueous solution of a water-soluble polymer, such as polyvinyl alcohol. The solvent is an organic solvent, for example, dimethyl formamide specifically. The method for applying the second alignment agent solution is the same as the method for applying the first alignment agent solution. Note that the second alignment film 60 may be uniaxially orientated by irradiation with linearly polarized light.

Figure 11D:
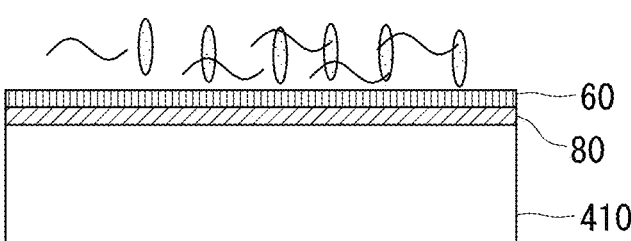

As illustrated in FIG. 11D, a second liquid crystal solution is applied onto a second surface of the second alignment film 60 next. The second liquid crystal solution contains a plurality of (many) monomers, a polymerization initiator, and a plurality of (many) second liquid crystal molecules. The plurality of monomers each are a liquid crystal mono-mer or a non-liquid crystal monomer, for example. The solvent is an organic solvent, for example. Specific examples of the solvent include methyl ethyl ketone, tolu-ene, propylene glycol monomethyl ether acetate (PGMEA), cyclohexanone, methyl isobutyl ketone, dimethylacetamide, dimethyl formamide, and cyclopentanone. The method for applying the second liquid crystal solution is the same as the method for applying the first liquid crystal solution.

Figure 11E:
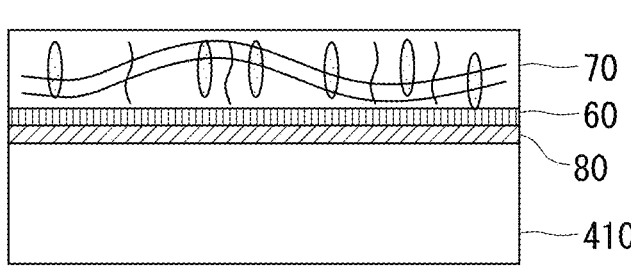

As illustrated in FIG. 11E, polymerization of the plurality of monomers is caused next to form macromolecules form-ing a three-dimensional network structure, thereby forming the second liquid crystal layer 70. The method for polym-erizing the plurality of monomers can be selected as appro-priate according to use of the liquid crystal element and may be irradiation of active energy rays or thermal polymerization, for example. Specifically, the plurality of monomers are polymerized by irradiating the polymerization initiator with ultraviolet rays.

Figure 12:
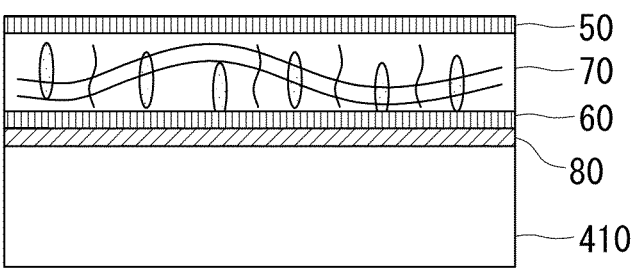
FIG. 12 is a cross-sectional view for depicting the method for producing the liquid crystal element according to the fourth embodiment.

Next, the second electrode 50 is formed on a second surface of the second liquid crystal layer 70 as illustrated in FIG. 12. For example, PEDOT, Ag, ITO, IZO, or IZTO, each of which is a conductive polymer, may be applied or deposited onto the second liquid crystal layer 70.

Next, the first wire 26 is wired on a first surface of the auxiliary electrode 25 and the second wire 27 is wired on the second area 10b of the first electrode 20 as illustrated in FIGS. 8 and 9. Finally, a second surface of the second electrode 50 and a first surface of the first liquid crystal layer 40 are bonded together, thereby producing the liquid crystal element 400.

As has been described so far with reference to FIGS. 10A to 12, the liquid crystal solutions are applied for liquid crystal layer formation in the method for producing the liquid crystal element 400 according to the fourth embodi-ment. As a result, the thickness $d_{40}$ of the first liquid crystal layer 40 and the thickness $d_{70}$ of the second liquid crystal layer 70 can be reduced. In detail, the thickness $d_{40}$ of the first liquid crystal layer 40 and the thickness dro of the second liquid crystal layer 70 can easily be reduced com-pared to that of a liquid crystal layer formed by sealing a liquid crystal solution between a glass substrate and a glass substrate.

Embodiments of the present invention have been described so far with reference to the accompanying draw-ings. However, the present invention is not limited to the above embodiments and may be implemented in various manners (e.g., (1) to (4) below) within a scope not departing from the gist thereof. Also, various inventions can be formed by appropriately combining elements of configuration dis-closed in the above embodiments. For example, some ele-ments of configuration may be omitted from all the elements of configuration indicated in the embodiments. Alternatively or additionally, elements of configuration in different embodiments can be combined as appropriate. The drawings schematically illustrate elements of configuration in order to facilitate understanding. Properties such as the thickness, length, number, and intervals of each element of configu-ration illustrated in the drawings may differ from actual properties in order to facilitate preparation of the drawings. Furthermore, the material, shape, dimensions, and the like of each element of configuration indicated in the above embodiments are examples and not particular limitations. Various alterations may be made so long as there is no substantial deviation from the effects of the present inven-tion.

(1) In the first embodiment, the number of the liquid crystal layers formed may be any number, as long as it is at least 2. Additionally, the two or more liquid crystal layers may have different thicknesses.

(2) In the first embodiment, the first substrate 10 has a substantially flat plate shape. However, the first substrate 10 may be curved either concavely or convexly. The surface of the first substrate 10 may have uneven shape.

(3) In the first embodiment, the light SA enters the first substrate 10 at an angle of incidence of around 90 degrees relative to the first substrate 10. However, the light SA may enter the substrate 10 at an acute angle of incidence relative to the first substrate 10.

(4) In the first embodiment, the liquid crystal layers contain nematic liquid crystals. However, the liquid crystal layers may contain both nematic liquid crystals and a chiral agent, contain cholesteric liquid crystals, contain smectic liquid crystals, or contain columnar liquid crystals. Alternatively or additionally, the plurality of liquid crystal molecules may be oriented to be in a saw shape, a concave shape, or a convex shape in the liquid crystal layers in the first state.

The present invention is specifically described next using examples. However, the present invention is not limited to the following examples.

EXAMPLES

Example

First, a glass substrate with a thickness of 0.7 mm was prepared as the first substrate 10. Here, the glass substate was a substrate on which ITO serving as the first electrode 20 has been deposited. Next, a first alignment agent solution was applied onto the first electrode 20 by spin coating to form a first alignment film 30 with a thickness of 0.1 μm. The first alignment agent solution contained an azobenzene-based optical alignment agent and dimethyl formamide.

Next, the first alignment film 30 was uniaxially orientated by irradiation with linearly polarized light.

Next, a first liquid crystal solution was applied onto the first alignment film 30 by spin coating. The first liquid crystal solution contained 9 parts by mass of polymerizable nematic liquid crystals ("LC242", product of BASF), 1 part by mass of a photopolymerization initiator ("IRGACURE OXE04", product of BASF), and 90 parts by mass of nematic liquid crystals ("DLC-100-200", product of DIC Corporation). Next, the resulting liquid crystal film is irradiated with ultraviolet rays to polymerize the polymerizable nematic liquid crystals to form a first liquid crystal layer 40 with a thickness of approximately 2.5 μm.

Next, a conductive polymer (PEDOT, Product of Sigma-Aldrich) was applied onto the first liquid crystal layer 40 to form a second electrode 50 with a thickness of 0.1 μm.

Next, a second substrate 410 with ITO deposited thereon to serves as a third electrode 80 was prepared, and a second alignment agent solution was applied onto the second substrate 410 by spin coating to form a second alignment film 60 with a thickness of 0.1 μm. The second alignment agent solution was the same as the first alignment agent solution.

Next, the second alignment film 60 was uniaxially orientated by irradiation with linearly polarized light.

Next, a second liquid crystal solution was applied onto the second alignment film 60 by spin coating. The second liquid crystal solution was the same as the first liquid crystal solution.

Next, the resulting liquid crystal film was irradiated with ultraviolet rays to polymerize the polymerizable nematic liquid crystals, thereby forming a second liquid crystal layer 70 with a thickness of 2.5 μm.

Next, the second electrode 50 as a first liquid crystal substrate and the second liquid crystal layer 70 as a second liquid crystal substrate were bonded together to produce an element in a sandwich form. In doing so, an electric lead wire was wired to bring the first electrode 20 and the third electrode 80 into contact with each other through a conductor, to equalize their potentials, while ensuring that the second electrode 50 is out of electrical contact therewith. As a result, a liquid crystal element of Example was obtained.

Evaluation of Liquid Crystal Element of Example

Figure 13:
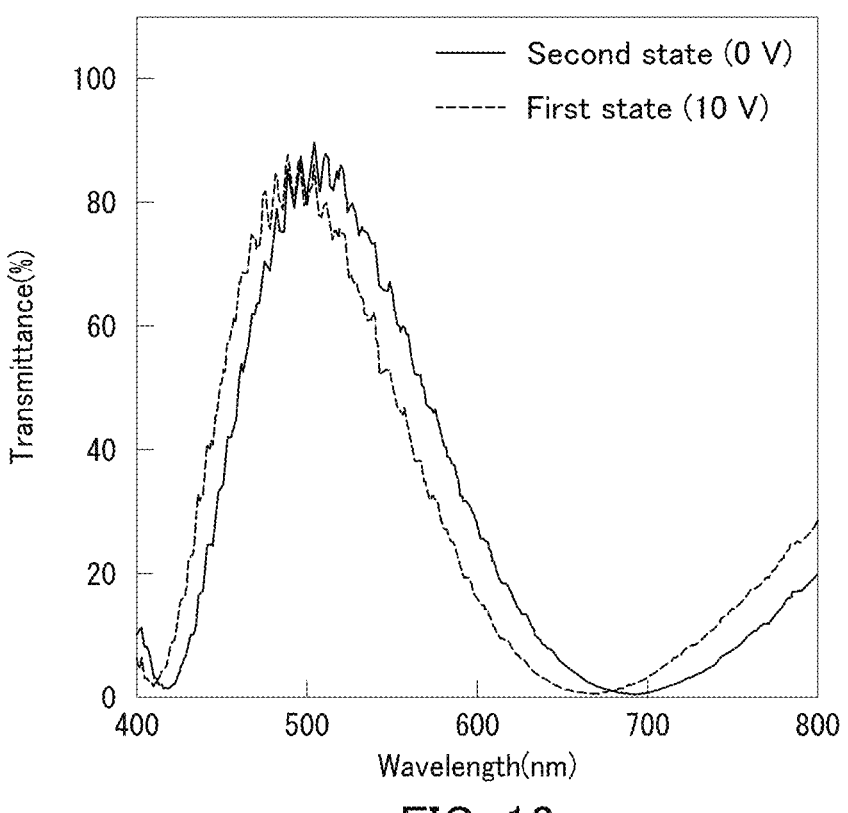
FIG. 13 is a graph representation showing the transmittance of a liquid crystal element of an example.

Switching between the first state and the second state in the liquid crystal element of Example was tried by applying rectangular wave voltage at a frequency of 1 kHz to the first electrode 20 and the third electrode 80. In the first state, a rectangular wave voltage of 10 V at a frequency of 1 kHz was applied to the first electrode 20 and the third electrode 80. In the second state, no potential was applied. Transition between the first state and the second state was detected according to change in transmittance where the liquid crystal element was set between polarizers of which transmission axes were orthogonal to each other in a fashion that the easy axis of orientation of the liquid crystal element formed an angle of 45° relative to the transmission axes of the polarizers. FIG. 13 is a graph representation showing the transmittance of the liquid crystal element of Example. The vertical axis indicates transmittance. The horizontal axis indicates wavelength.

As shown in FIG. 13, the transmittance of the liquid crystal element of Example was changed by applying a rectangular wave voltage of 10 V at a frequency of 1 kHz to the first electrode 20 and the third electrode 80. From the above, it was confirmed that the state change between the first state and the second state was caused by applying a rectangular wave voltage of 10 V at a frequency of 1 kHz to the first electrode 20 and the third electrode 80.

Comparative Example

In order to confirm the effects of the liquid crystal element of Example, an element (liquid crystal element of Comparative Example) including liquid crystal layers but not including the second electrode 50 in the middle was prepared. Here, the liquid crystal layers had an overall thickness (approximately 5 μm) which the liquid crystal layers of the liquid crystal element of Example had. Thereafter, a rectangular wave voltage at a frequency of 1 kHz was applied to the first electrode 20 and the third electrode 80 to switch the state thereof between the first state and the second state.

That is, an alignment film is formed on each of two glass substrates each with an ITO electrode, and UV irradiation was performed thereon to render the alignment film uniaxially orientated.

The two glass substrates were bonded together with a gap of 5 μm therebetween, and the gap was then filled with the first liquid crystal solution. After checking the alignment of the liquid crystals, UV irradiation was performed to polymerize the liquid crystal monomers, thereby obtaining a liquid crystal layer with a thickness of 5 μm.

Evaluation of Liquid Crystal Element of Comparative Example

Figure 14:
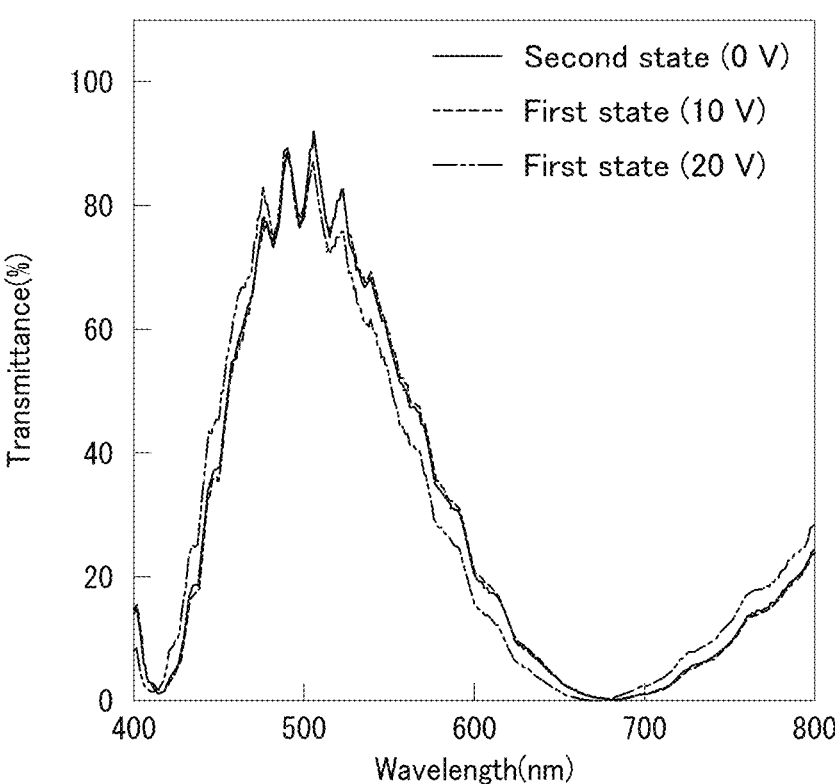
FIG. 14 is a graph representation showing the transmittance of a liquid crystal element of a comparative example.

A rectangular wave voltage at a frequency of 1 kHz was applied to the first electrode 20 and the third electrode 80 of the liquid crystal element of Comparative Example 1 to try to switch the state of the liquid crystal element between the first state and the second state. In the first state, a rectangular wave voltage of 10 V at a frequency of 1 kHz was applied to the first electrode 20 and the third electrode 80. In the second state, no potential was applied thereto. Transition between the first state and the second state was detected according to change in transmittance where the liquid crystal element was set between polarizers of which transmission axes were orthogonal to each other in a fashion that the easy axis of orientation of the liquid crystal element formed an angle of 45° relative to the transmission axes of the polarizers. FIG. 14 is a graph representation showing the transmittance of the liquid crystal element of Comparative Example. The vertical axis indicates transmittance. The horizontal axis indicates wavelength.

As shown in FIG. 14, application of a rectangular wave voltage of 10 V at a frequency of 1 kHz to the first electrode 20 and the third electrode 80 did not change the transmittance of the liquid crystal element of Comparative Example. Application of 20-V voltage was necessary to confirm significant change in transmittance, that is, necessary for state switching between the first state and the second state.

From the above, a potential difference of 10 V between the first electrode 20 and the second electrode 50 changed the orientation of the plurality of liquid crystal molecules in the liquid crystal element of Example. By contrast, the orientation of the plurality of liquid crystal molecules did not change in the liquid crystal element of Comparative Example unless the potential difference between the first electrode 20 and the second electrode 50 was increased to 20 V.

The voltage that was able to change the orientation of the plurality of liquid crystal molecules in the liquid crystal element of Example was approximately half of that in the liquid crystal element of Comparative Example. This was because the presence of the second electrode 50 in the middle between the liquid crystal layers increased electric field strength (potential difference/distance where potential difference is present), even the thicknesses of the liquid crystal layers were the same.

INDUSTRIAL APPLICABILITY

The present invention provides a liquid crystal element and is applicable to industry.

REFERENCE SIGNS LIST

20 First electrode
40 First liquid crystal layer
50 Second electrode
70 Second liquid crystal layer
80 Third electrode
100 Liquid crystal element

The invention claimed is:

1. A liquid crystal element comprising:
a first electrode with light transmittance;
a first liquid crystal layer containing first macromolecules and a plurality of first liquid crystal molecules;
a second electrode with light transmittance;
a second liquid crystal layer containing second macromolecules and a plurality of second liquid crystal molecules; and
a third electrode with light transmittance, wherein
the first liquid crystal layer is placed between the first electrode and the second electrode,
the second liquid crystal layer is placed between the second electrode and the third electrode,
the first electrode, the first liquid crystal layer, the second electrode, the second liquid crystal layer, and the third electrode are stacked in a predetermined direction,
a potential of the first electrode and a potential of the third electrode are equal to each other,
the first macromolecules form a three-dimensional network structure in the first liquid crystal layer,
the second macromolecules form a three-dimensional network structure in the second liquid crystal layer,
a state of the liquid crystal element is switched between a first state and a second state, in the first state, orientation of the plurality of first liquid crystal molecules is along the predetermined direction and orientation of the plurality of second liquid crystal molecules is along the predetermined direction, and
in the second state, orientation of the plurality of first liquid crystal molecules is along a direction across the predetermined direction and orientation of the plurality of second liquid crystal molecules is along the direction across the predetermined direction,
the liquid crystal element further comprising:
a first alignment film that defines orientation of the plurality of first liquid crystal molecules; and
a second alignment film that defines orientation of the plurality of second liquid crystal molecules, wherein
the first alignment film is placed between the first liquid crystal layer and the first electrode or the second electrode, and
the second alignment film is placed between the second liquid crystal layer and the second electrode or the third electrode,
light passes through the first electrode, the first liquid crystal layer, the second electrode, the second liquid crystal layer, and the third electrode,
the liquid crystal element emits first light in the first state,
the liquid crystal element emits second light in the second state, and
the first light differs from the second light in phase, wavelength, polarization state, or direction of travel.

2. The liquid crystal element according to claim 1, wherein
in the first state, a potential difference between the first electrode and the second electrode and a potential difference between the second electrode and the third electrode are formed so that orientation of the plurality of first liquid crystal molecules is along the predetermined direction and orientation of the plurality of second liquid crystal molecules is along the predetermined direction, and
in the second state, no potential difference is formed between the first electrode, the second electrode, and the third electrode so that orientation of the plurality of first liquid crystal molecules is along a direction across the predetermined direction and orientation of the plurality of second liquid crystal molecules is along the direction across the predetermined direction.

3. The liquid crystal element according to claim 1, wherein
in the first state, the first electrode and the third electrode are kept at a first potential while the second electrode is kept at a second potential different from the first potential, and
in the second state, no potential difference is formed between the first electrode, the second electrode, and the third electrode.

4. The liquid crystal element according to claim 1, further comprising:
a first substrate with light transmittance; and
a second substrate, wherein
the first electrode, the first liquid crystal layer, the second electrode, the second liquid crystal layer, and the third electrode are placed between the first substrate and the second substrate.

5. The liquid crystal element according to claim 1, wherein
the first macromolecules and the second macromolecules are macromolecules obtained by polymerizing a plurality of liquid crystal monomers.

6. The liquid crystal element according to claim 1, further comprising:

a first alignment film that defines orientation of the plurality of first liquid crystal molecules; and a second alignment film that defines orientation of the plurality of second liquid crystal molecules, wherein the first alignment film is placed between the first liquid crystal layer and the first electrode or the second electrode, and the second alignment film is placed between the second liquid crystal layer and the second electrode or the third electrode.

7. A liquid crystal element comprising:

a first electrode with light transmittance;

a first liquid crystal layer containing first macromolecules and a plurality of first liquid crystal molecules;

a second electrode with light transmittance;

a second liquid crystal layer containing second macromolecules and a plurality of second liquid crystal molecules; and a third electrode with light transmittance, wherein the first liquid crystal layer is placed between the first electrode and the second electrode, the second liquid crystal layer is placed between the second electrode and the third electrode, the first electrode, the first liquid crystal layer, the second electrode, the second liquid crystal layer, and the third electrode are stacked in a predetermined direction, a potential of the first electrode and a potential of the third electrode are equal to each other, the first macromolecules form a three-dimensional network structure in the first liquid crystal layer, the second macromolecules form a three-dimensional network structure in the second liquid crystal layer, a state of the liquid crystal element is switched between a first state and a second state, in the first state, orientation of the plurality of first liquid crystal molecules is along the predetermined direction and orientation of the plurality of second liquid crystal molecules is along the predetermined direction, and in the second state, orientation of the plurality of first liquid crystal molecules is along a direction across the predetermined direction and orientation of the plurality of second liquid crystal molecules is along the direction across the predetermined direction, the liquid crystal element further comprising:

a third liquid crystal layer containing third macromolecules and a plurality of third liquid crystal molecules; and a fourth electrode with light transmittance, wherein the third liquid crystal layer is placed between the third electrode and the fourth electrode, and the third macromolecules form a three-dimensional network structure in the third liquid crystal layer.

8. The liquid crystal element according to claim 7, wherein in the first state, a potential difference between the first electrode and the second electrode and a potential difference between the second electrode and the third electrode are formed so that orientation of the plurality of first liquid crystal molecules is along the predetermined direction and orientation of the plurality of second liquid crystal molecules is along the predetermined direction, and in the second state, no potential difference is formed between the first electrode, the second electrode, and the third electrode so that orientation of the plurality of first liquid crystal molecules is along a direction across the predetermined direction and orientation of the plurality of second liquid crystal molecules is along the direction across the predetermined direction.

9. The liquid crystal element according to claim 7, wherein in the first state, the first electrode and the third electrode are kept at a first potential while the second electrode is kept at a second potential different from the first potential, and in the second state, no potential difference is formed between the first electrode, the second electrode, and the third electrode.

10. The liquid crystal element according to claim 7, further comprising:

a first substrate with light transmittance; and a second substrate, wherein the first electrode, the first liquid crystal layer, the second electrode, the second liquid crystal layer, and the third electrode are placed between the first substrate and the second substrate.

11. The liquid crystal element according to claim 7, wherein the first macromolecules and the second macromolecules are macromolecules obtained by polymerizing a plurality of liquid crystal monomers.

12. The liquid crystal element according to claim 7, further comprising:

a first alignment film that defines orientation of the plurality of first liquid crystal molecules; and a second alignment film that defines orientation of the plurality of second liquid crystal molecules, wherein the first alignment film is placed between the first liquid crystal layer and the first electrode or the second electrode, and the second alignment film is placed between the second liquid crystal layer and the second electrode or the third electrode.

* * * * *